US012378501B2

(12) United States Patent
Palla Venkata et al.

(10) Patent No.: US 12,378,501 B2
(45) Date of Patent: Aug. 5, 2025

(54) CANDLE AND METHOD OF MAKING THEREOF

(71) Applicant: S. C. Johnson & Son, Inc., Racine, WI (US)

(72) Inventors: Chandra S. Palla Venkata, Franklin, WI (US); Deborah H. Parker, Racine, WI (US); Michael M. Fryd, Oak Creek, WI (US); Anthony Merten, Racine, WI (US); Cassandra A. Blair, Kenosha, WI (US); Steven A. Hooper, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 67 days.

(21) Appl. No.: 17/211,364

(22) Filed: Mar. 24, 2021

(65) Prior Publication Data

US 2022/0306966 A1 Sep. 29, 2022

(51) Int. Cl.
*C11C 5/00* (2006.01)
*C11C 5/02* (2006.01)

(52) U.S. Cl.
CPC .............. *C11C 5/008* (2013.01); *C11C 5/002* (2013.01)

(58) Field of Classification Search
CPC ................................ C11C 5/008; C11C 5/002
See application file for complete search history.

(56) References Cited

U.S. PATENT DOCUMENTS

| | | | | | |
|---|---|---|---|---|---|
| 22,921 | A * | 2/1859 | Leonard | B29C 35/16 | 264/28 |
| 59,749 | A * | 11/1866 | Ryder | C11C 5/021 | 264/28 |
| 3,441,432 | A * | 4/1969 | Levene | C03C 17/30 | 351/159.57 |
| 3,752,433 | A | 8/1973 | Berman | | |
| 3,898,039 | A * | 8/1975 | Lin | F21V 33/0004 | 424/416 |

(Continued)

FOREIGN PATENT DOCUMENTS

| | | |
|---|---|---|
| CN | 104444184 A | 3/2015 |
| CN | 205398583 U | 7/2016 |

(Continued)

OTHER PUBLICATIONS

Wikihow; "How to Make Candles"; https://www.wikihow.com/Make-Candles; Feb. 20, 2020 (Year: 2020).*

(Continued)

*Primary Examiner* — Michael G Hoang
*Assistant Examiner* — Logan P Jones
(74) *Attorney, Agent, or Firm* — Quarles & Brady LLP

(57) ABSTRACT

The present disclosure provides a candle that includes a jar having an interior surface, a fuel within the jar, a wick positioned within the fuel, and a material layer at least partially extending between the fuel and the interior surface of the jar, wherein the material layer includes a hydrophobic molecule. Further provided herein is a method for producing a candle, which includes a step of providing a jar having an interior surface, a step of pre-coating the interior surface with a hydrophobic molecule, a step of pouring a fuel composition into the jar, and a step of allowing the fuel composition to solidify.

4 Claims, 7 Drawing Sheets

(56) References Cited

U.S. PATENT DOCUMENTS

| | | | | | |
|---|---|---|---|---|---|
| 5,374,303 | A * | 12/1994 | van Hoorn | B28B 7/384 106/38.22 |
| 5,783,657 | A | 7/1998 | Pavlin et al. | |
| 5,998,570 | A | 12/1999 | Pavlin et al. | |
| 6,111,055 | A | 8/2000 | Berger et al. | |
| 6,155,451 | A * | 12/2000 | Pietruch | B65D 25/14 220/608 |
| 6,169,160 | B1 | 1/2001 | MacQueen et al. | |
| 6,242,509 | B1 | 6/2001 | Berger et al. | |
| 6,491,517 | B2 * | 12/2002 | Freeman | F23D 3/16 431/126 |
| 6,517,343 | B2 | 2/2003 | Jones et al. | |
| 2002/0172759 | A1 * | 11/2002 | LaFay | B28B 7/384 427/133 |
| 2010/0285148 | A1 * | 11/2010 | Wlaschin | A61P 31/04 514/635 |
| 2012/0148965 | A1 | 6/2012 | Allison | |
| 2014/0045127 | A1 | 2/2014 | Jacobs | |
| 2014/0306026 | A1 | 10/2014 | Santini et al. | |
| 2014/0366430 | A1 | 12/2014 | Jobelius | |
| 2017/0073901 | A1 * | 3/2017 | Ohr | D21H 19/62 |

FOREIGN PATENT DOCUMENTS

| | | | | |
|---|---|---|---|---|
| CN | 111594801 | A | 8/2020 | |
| DE | 2330031 | A1 | 1/1974 | |
| DE | 102008044107 | A1 * | 6/2010 | C11C 5/008 |
| EP | 2883948 | A1 | 6/2015 | |
| EP | 3254768 | A1 * | 12/2017 | |
| JP | 2019212594 | A | 12/2019 | |
| KR | 101634499 | B1 | 6/2016 | |
| SE | 8401514 | L | 9/1985 | |
| WO | 2005100854 | A2 | 10/2005 | |
| WO | 2015033347 | A1 | 3/2015 | |

OTHER PUBLICATIONS

Molly MC; “The ‘Does It Work?’ Challenge: Prevent Wax from Sticking with Cooking Spray”; https://www.curbly.com/13551-the-does-it-work-challenge-prevent-wax-from-sticking-with-cooking-spray; Mar. 14, 2012 (Year: 2012).*

Crvella; “Mineral Oil Additive. Tiki Torch Smell”; https://www.craftserver.com/topic/106457-mineral-oil-additive-tiki-torch-smell/; Feb. 14, 2015 (Year: 2015).*

Eroma Store Pty Ltd., “Adhesion Issues Tips, Techniques & Remedies,” [online URL: <https://www.eroma.com.au/learning/tips-and-techniques/adhesion-problems> (retrieved online: Dec. 11, 2020) (3 pages).

International Search Report and Written Opinion for PCT/US2022/011573, mailed May 12, 2022. (9 pages).

Anonymous: “Candle Wet Spots: How to Fix Them and Prevent Them”, Mar. 10, 2021 (Mar. 10, 2021), XP55909963, Retrieved from the Internet: URL:https://www.candleers.com/candle-wet-s pots/ [retrieved on Apr. 6, 2022] p. 2 p. 7. (14 pages).

Bruscatto et al., Chemical characterization and oxidative stability of olive oils extracted from olive trees of Southern Brazil, Pesquisa Agropecuária Brasileira, Brasília, 2017, 52(12):1231-1240.

Brazilian National Institute of Industrial Property (INPI), Technical Examination Report, Application No. BR 11 2023 019491-1, Mar. 6, 2025, 13 pages.

* cited by examiner

CANDLE AND METHOD OF MAKING THEREOF

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present invention relates generally to candles having a material layer at least partially between an interior surface of a jar and a fuel composition within the jar, wherein the material layer includes a hydrophobic molecule.

2. Description of the Background of the Invention

Candles made from paraffin or wax are well known and processes used to manufacture candles can vary. However, candles, and the process of producing candles, is an art that continues to see improvements. In their simplest form, candles are composed of a wax or paraffin composition having a wick extending therethrough, and can be formed from pouring wax material into a mold or jar and allowing the wax to solidify. During this process, however, poor adhesion between the wax and its surrounding surface can occur.

For example, when making candles in glassware, such as clear glasses jars, a wax or paraffin composition can be poured into a glass container or jar, and shrink while cooling or solidifying. As a result, air pockets typically form between an interior surface of the glass jar and the solid wax, which reduces adhesion between the wax and the interior surface of the glass jar. This adhesion loss is problematic for several reasons. For one, this adhesion loss increases the probability that the wax will become dislodged from the glass jar during use. Additionally, when using clear glass jars, these air pockets are visible and not aesthetically pleasing.

Poor adhesion between wax and surfaces is a very common issue. In some instances, to partially solve the issue, candle makers choose to use frosted glass jars, rather than clear glass containers, such that the air pockets are not visible. In other instances, candle makers may cover the outer surface of the glass jars with a label. However, what is needed is a candle and candle making process that overcomes the aesthetic and functional drawbacks caused by poor adhesion between wax and its surrounding surface.

SUMMARY OF THE INVENTION

In one aspect, the present disclosure provides a candle having a jar with an interior surface, a fuel within the jar, a wick positioned within the fuel, and a material layer at least partially extending between the fuel and the interior surface of the jar, wherein the material layer includes a hydrophobic molecule.

In some embodiments, the hydrophobic molecule is a vegetable oil, and in these embodiments, the vegetable oil may be olive oil. In other embodiments, the hydrophobic molecule is a branched alcohol having a $C_7$-$C_{13}$ hydrocarbon chain, and in particular embodiments, the hydrocarbon is selected from the group consisting of lineolic acid, linelenic acid, and arachidonic acid. Additionally, in further embodiments, the hydrophobic molecule is a motor oil having a viscosity grade, using the SAE J300 standard, selected from the group consisting of 0W-10, 0W-15, 0W-20, 0W-25, 0W-30, 5W-10, 5W-15, 5W-20, 5W-25, and 5W-30. In a particular embodiment, the motor oil has a viscosity grade of 5W-10. The material may also include a cold-end-coating glass coating, such as RP40. Further, the fuel may be a paraffin wax composition.

In further aspects, the present disclosure provides a method for producing a candle. The method includes the steps of providing ajar having an interior surface, pre-coating the interior surface with a hydrophobic molecule, pouring a fuel composition into the jar, and allowing the fuel composition to solidify.

In some embodiments, the hydrophobic molecule is a vegetable oil, and in these embodiments, the vegetable oil may be olive oil. Additionally, in other embodiments, the hydrophobic molecule is a motor oil having a viscosity grade, using the SAE J300 standard, selected from the group consisting of 0W-10, 0W-15, 0W-20, 0W-25, 0W-30, 5W-10, 5W-15, 5W-20, 5W-25, and 5W-30. In a particular embodiment, the motor oil has a viscosity grade of 5W-10. In another embodiment, the hydrophobic molecule is a branched alcohol having a $C_7$-$C_{13}$ hydrocarbon chain. Further, the method may also include a step of pre-heating the jar to a pre-determined temperature.

In further embodiments, the present disclosure provides another method of producing a candle that includes the steps of providing ajar having an interior surface, pre-coating the interior surface with a hydrophobic molecule, pouring a fuel composition into the jar, and allowing the fuel composition to solidify at a temperature below 4° C.

In some embodiments, the method also includes a step of pre-heating the jar to a pre-determined temperature. Further, the step of allowing the fuel composition to solidify at a temperature below 4° C. is performed for greater than 20 minutes or greater than 6 hours. Further, the hydrophobic molecule may be a vegetable oil or a motor oil having a viscosity grade, using the SAE J300 standard, selected from the group consisting of 0W-10, 0W-15, 0W-20, 0W-25, 0W-30, 5W-10, 5W-15, 5W-20, 5W-25, and 5W-30. In some embodiments, the hydrophobic molecule is selected from the group consisting of a vegetable oil, a branched alcohol having a $C_7$-$C_{13}$ hydrocarbon chain, and a motor oil.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
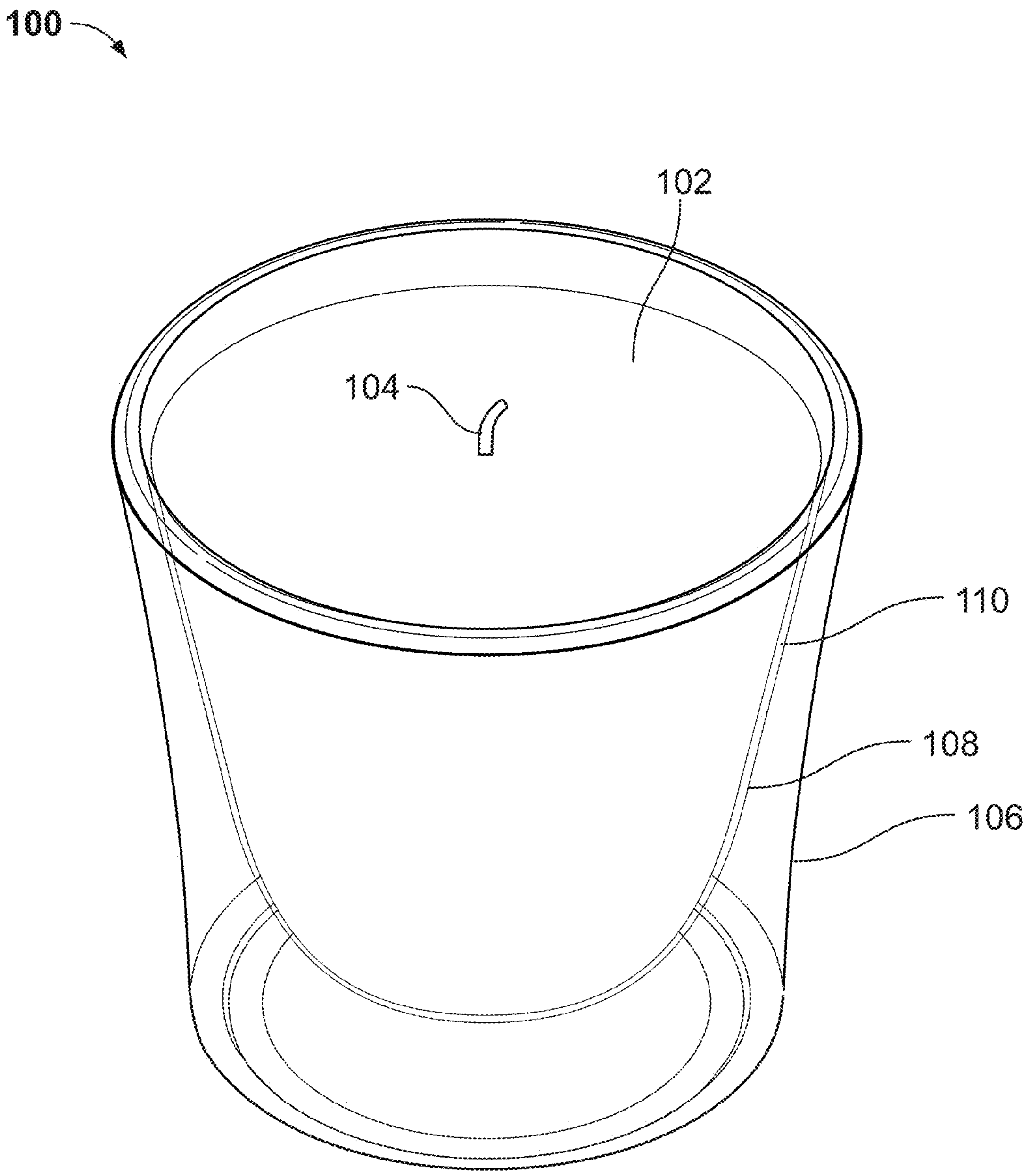
FIG. 1 is a perspective view of a candle produced using the process described herein.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures, which are not necessarily to scale, depict selected embodiments and are not intended to limit the scope of embodiments of the invention. Skilled artisans may also recognize that the examples provided herein have many useful alternatives and fall within the scope of embodiments of the invention.

The present disclosure, in one embodiment, provides a candle that includes a wick, a wax or fuel composition, and a coating composition or material layer. The coating composition or material layer improves adhesion between the wax composition and a surrounding surface, which encases the wax composition.

Figure 2:
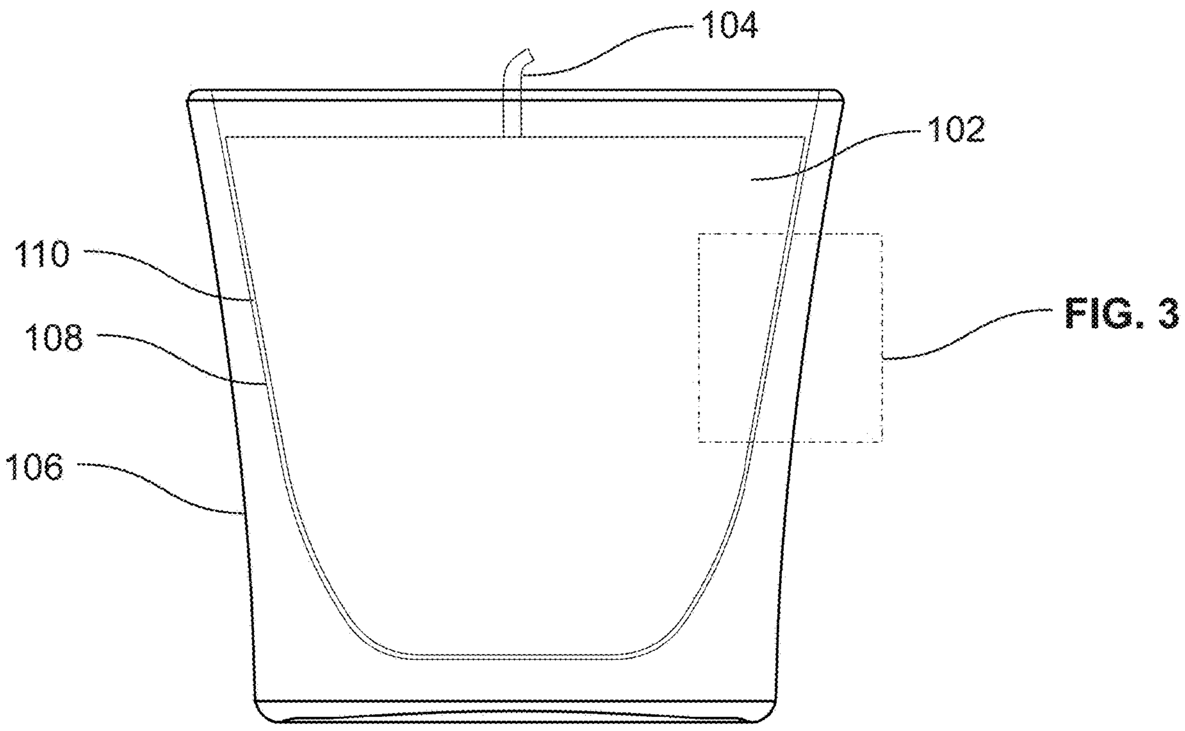
FIG. 2 is a front elevational view of the candle of FIG. 1.
Figure 3:
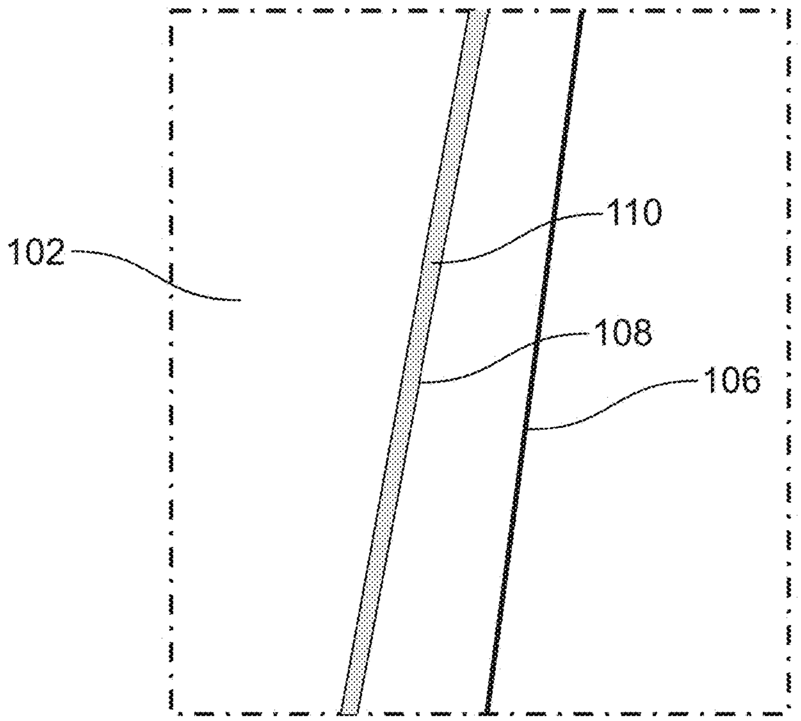
FIG. 3 is an magnified view of a portion of the candle depicted in FIG. 2.

FIGS. 1-3 illustrate a candle 100, or portions thereof, produced from the process discussed herein. As shown in FIGS. 1 and 2, the candle 100 generally includes a wax or fuel composition 102, a wick 104, and a jar 106 having an interior surface 108 that surrounds or encases the wax composition 102. Further, as best shown in FIG. 3, a material layer 110 is between the wax composition 102 and the interior surface 108 of the jar 106.

In most embodiments, the material layer 110 is a nonpolar or hydrophobic oil or molecule that helps to eliminate air pockets between the wax or fuel composition 102 and the interior surface 108 of the jar 106, when the wax or fuel composition 102 solidifies. Glass and glass surfaces, such as the interior surface 108 of the jar 106, are typically polar and exhibit a strong affinity towards other polar molecules, such as water molecules. Waxes, on the other hand, are typically composed of long, nonpolar carbon chains and, thus, are hydrophobic and nonpolar. As a result, adhesion, i.e., the attraction of molecules of one kind for molecules of a different kind, is weak between a wax composition, such as the wax or fuel composition 102, and a glass surface, such as the interior surface 108 of the jar 106. Thus, when the wax composition 102 cools and solidifies, no molecular force acts to prevent the wax composition 102 from separating from the interior surface 108 of the jar. Rather, in the case that the interior surface 108 is glass, the polar nature of the glass surface may act to exacerbate this separation, causing additional air pockets to form between the wax or fuel composition 102 and the interior surface 108. A liquid nonpolar oil, however, may act as a barrier material layer between the interior surface 108 and the wax or fuel composition 102. In effect, a liquid nonpolar oil, such as the material layer 110, may create a material layer between the wax or fuel composition 102 and the interior surface 108, thereby minimizing or eliminating the formation of air bubbles or spacing between the wax or fuel composition 102 and the interior surface 108. Additionally, the material layer 110, being nonpolar and hydrophobic, exhibits an adhesion or attraction force with the wax or fuel composition 102, which is also typically nonpolar and hydrophobic, and these molecular forces act to adhere the wax or fuel composition 102 to the interior surface 108.

The material layer 110 may be any hydrophobic, liquid material having a relatively low freezing point. For example, the material layer 110 may include a vegetable oil that is liquid at ambient temperatures (e.g., 23 degrees Celsius), including corn oil, canola oil, cottonseed oil, olive oil, peanut oil, rapeseed oil, safflower oil, sesame oil, soybean oil, or sunflower oil. Alternatively, other vegetable oils are envisioned, including nut oils, such as almond oil, beech nut oil, brazil nut oil, cashew oil, hazelnut oil, macadamia oil, mongongo nut oil, pecan oil, pine nut oil, pistachio oil, walnut oil, pumpkin seed oil; or citrus oils, such as grapefruit seed oil, lemon oil, or orange oil.

Vegetable oils are mainly complexes of triesters of glycerol, i.e., triacylglycerols (TAGs) or triglycerides, which are nonpolar and hydrophobic mixtures. Further, vegetable oils are liquid at room temperature or ambient temperature (e.g., 23 degrees Celsius) because of their high proportion of unsaturated acids and lipid structures. In a preferred embodiment, the material layer 110 is a vegetable oil having a freezing point below zero degrees Celsius (0° C.), such as olive oil, which has a freezing point of about −4° C.

In other embodiments, the material layer 110 may include another nonpolar oil. For example, the material layer 110 may include an oil typically used as a motor oil, engine oil, or engine lubricant. These oils typically consist of base oils enhanced with various additives, including antiwear additives, detergents, dispersants, and, for multi-grade oils, viscosity index improvers. The base oil and viscosity modifier may be selected to provide a desired viscosity grade, as is apparent to those skilled in the art. SAE J300 is a standard that typically defines the viscometric properties of engine oils, for example. The low temperature (W) grades (i.e., 10W-xx, 5W-xx, and 0W-xx) are determined by the performance in a combination of viscosity tests including cold crank simulation (CCS) (ASTM D5293) and low-temperature pumping viscosity (ASTM D4684). The high temperature grading for an engine oil (i.e., XW-20, W-30) is determined by kinematic viscosity at 100° C. (ASTM D445) and high-temp high-shear viscosity (ASTM D4683). Suitable viscosity grades include certain modern low-viscosity multigrades, such as 0W-10, 0W-15, 0W-20, 0W-25, 0W-30, 5W-10, 5W-15, 5W-20, 5W-25, and 5W-30, which together may be written as xW-y, where x is 0 to 5 and y is 10 to 30, e.g., 10, 15, 20, 25, or 30. In one particular embodiment, the material layer 110 may include an oil having a grade of 5W-10.

In further embodiments, the material layer 110 may include an oil, an alcohol, or a molecule having a particular head or head group on a hydrocarbon chain. In particular embodiments, the material layer 110 may include a branched alcohol or hydrocarbon chain having an indicated number of carbon atoms. For example, $C_7$-$C_{13}$ indicates that the group may have from 7 to 13 (inclusive) carbon atoms. In some embodiments, the material layer 110 may include a branched hydrocarbon or alcohol having a $C_7$-$C_{13}$ chain. In further embodiments, the material layer 110 may include a branched hydrocarbon having a $C_7$-$C_{21}$ chain, and in even further embodiments, the material layer 110 may include a hydrocarbon having a $C_3$-$C_{21}$ chain. In these embodiments, the hydrocarbons may include a particular head group, may be unsaturated, and may be branched such that the material layer 110 is liquid at room temperature and includes a relatively low freezing point, e.g., −4° C. In particular embodiments, the head or head group of the molecule for the material layer 110 is an ester. However, in other embodiments, the material layer 110 may include an unsaturated oil with a different head group. In particular embodiments, the material layer 110 may include a linoleic acid (C18:2), a linolenic acid (C18:3), and/or an arachidonic acid (C20:4).

The material layer 110 may also include additional elements beyond a hydrophobic molecule or oil. For example, in some embodiments, the material layer 110 includes an anti-scratch coating, such as RP40, which is a cold-end-coating system used in the glass industry.

Figure 4:
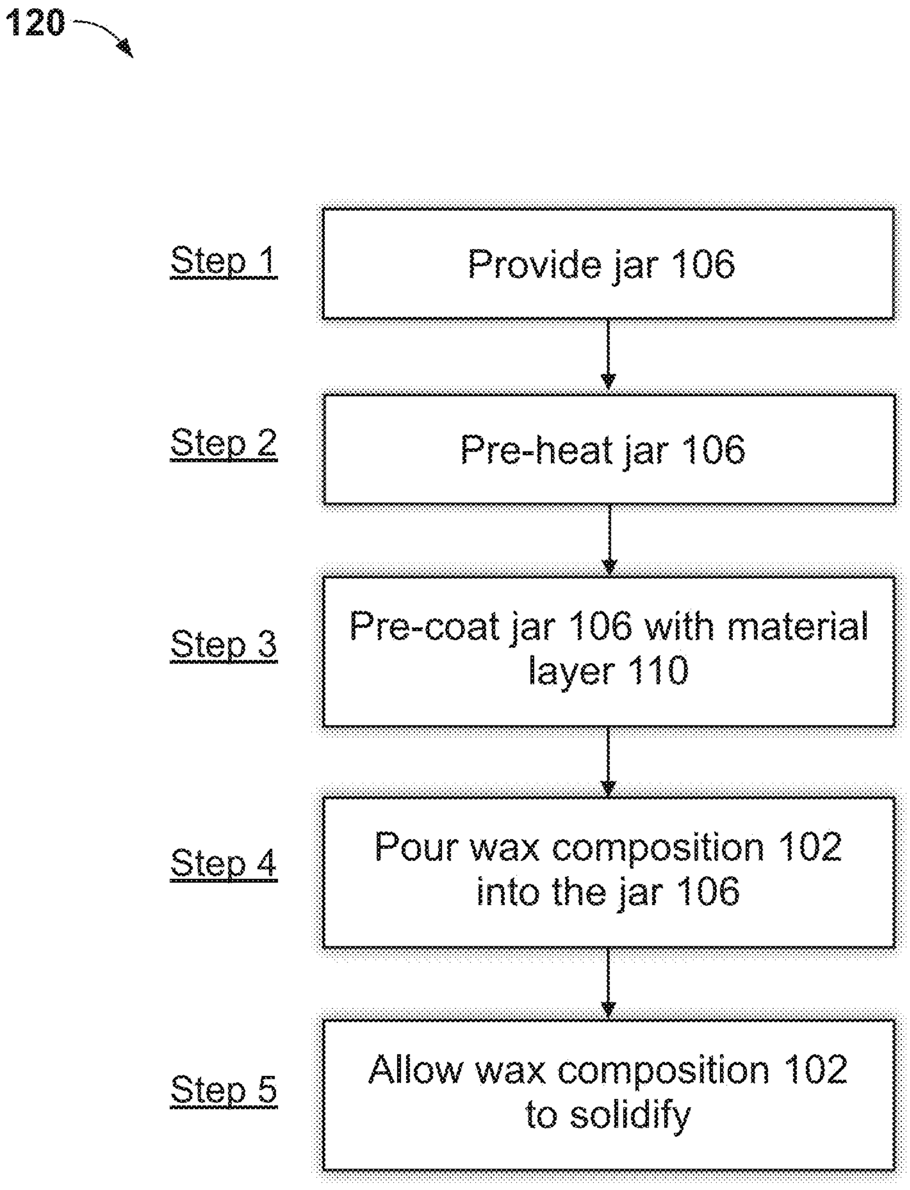
FIG. 4 schematically illustrates a method or process of making a candle using the process described herein.

The present disclosure also provides a process for producing the candle 100. FIG. 4 schematically illustrates a method or process 120 of making the candle 100. Step 1 of the method 120 may include the step of providing a clean, unused jar, such as the jar 106. Step 2 of the method 120 may include the step of pre-heating the jar 106. In particular embodiments, the jar 106 may be preheated at a temperature above 50° C., above 60° C., above 70° C., or above 80° C. Additionally, in these embodiments, the jar 106 may be pre-heated for about 1 hour, about 2 hours, about 3 hours, about 6 hours, about 12 hours, about 24 hours, or about 48 hours. In particular embodiments, the jar 106 is pre-heated at a temperature and for a duration of time such that a temperature differential between the interior surface 108 and a wax to be poured into the jar 106 is minimal. For example, in some embodiments, the jar 106 is pre-heated at a temperature and time such that a temperature differential between the interior surface 108 and a wax poured into the jar 106 (during step 4 discussed herein) is less than 15° C., less than 10° C., less than 5° C., or less than 2° C. In one particular embodiment, the jar 106 is pre-heated at a temperature of about 70° C. for about 24 hours.

Step 3 of the method 120 may include the step of coating the interior surface 108 of the jar 106 with the material layer 110. For example, in one embodiment, the interior surface 108 of the jar 106 can be wiped with a Kimwipe™ saturated with olive oil. In another embodiment, however, this pre-coating step may be automated or may be conducted using a spraying system, such that a sprayer evenly treats or applies the material layer 110 on the interior surface 108 of the jar 106.

Step 4 of the method 120 may include the step of pouring a wax composition, such as the wax composition 102, into the jar 106. Prior to this step, the wax composition 102 may be created and pre-heated to a pre-determined temperature. For example, in one embodiment, a paraffin wax is heated to a temperature of about 72° C., and then poured into the jar 106, which is also pre-heated at a temperature of about 70° C. in step 2 and pre-coated with the material layer 110 in step 3. Additionally, as discussed previously in connection with step 2, a temperature differential between the pre-heated jar 106 of step 2 and the wax composition 102 poured into the jar 106 during step 4 should be minimal and, in particular embodiments, should be less than 15° C., less than 10° C., less than 5° C., or less than 2° C.

Step 5 of the method 120 may include the step of allowing the candle 100, which includes the jar 106, the wax composition 102, and the material layer 110, to cool, such that the wax composition 102 solidifies.

Figure 5:
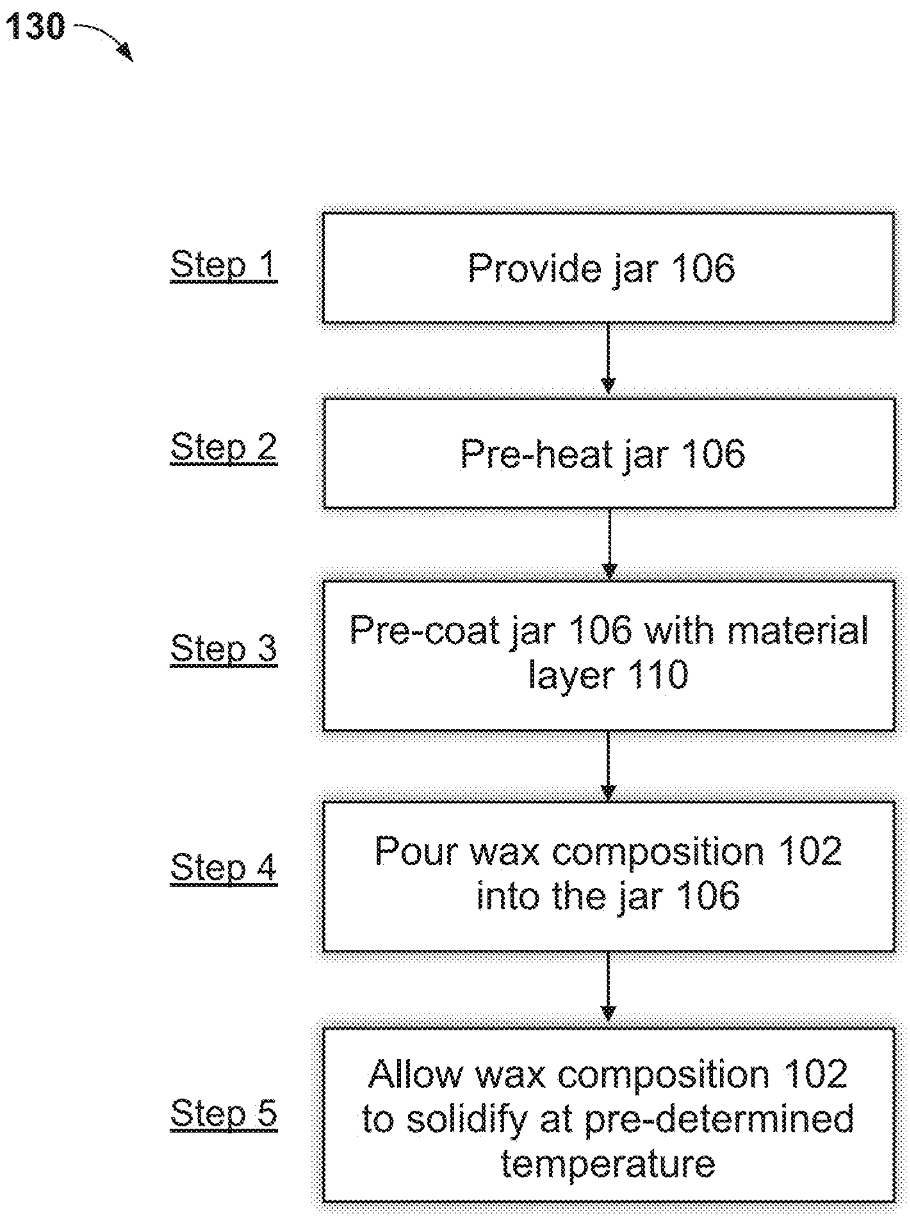
FIG. 5 schematically illustrates another method or process of making a candle using another process described herein.

FIG. 5 schematically illustrates another method or process 130 of making the candle 100. The method 130 includes steps 1-4 previously discussed in connection with the method 120. However, in this particular embodiment, during step 5, the candle 100 and the wax composition 102 solidifies at a pre-determined temperature for a pre-determined amount of time. In one particular embodiment, the candle 100 is placed within a temperature controlled environment, such as a freezer, and allowed to solidify at a pre-determined temperature below about 10° C., or below about 5° C., or below about 4° C., or below about 0° C. Additionally, in these embodiments, the candle 100 may be allowed to solidify within these temperature controlled environments for about 1 hour, about 2 hours, about 3 hours, about 6 hours, about 12 hours, about 24 hours, or about 48 hours. In one particular embodiment, the candle 100 is allowed to solidify at a temperature of about 4° C. for at least 6 hours.

EXAMPLES

The examples herein are intended to illustrate certain embodiments of the candle 100 and methods 120, 130 of producing the candle 100 to one of ordinary skill in the art and should not be interpreted as limiting in the scope of the disclosure set forth in the claims. The candle 100, and the methods 120, 130 of making thereof, may comprise the following non-limiting examples.

Example 1

An experiment was performed to determine the effect of producing a candle using the process discussed herein. In this example, several clean, unused jars, such as the jar 106, were obtained and candles were prepared in the following ways. Table 1 provides a brief overview of the pre-coating methods, the pre-heating temperatures, and the cooling procedure for each batch of candles. Further, FIGS. 6-11 provide representative images of the candles produced using these methods.

Figure 6:
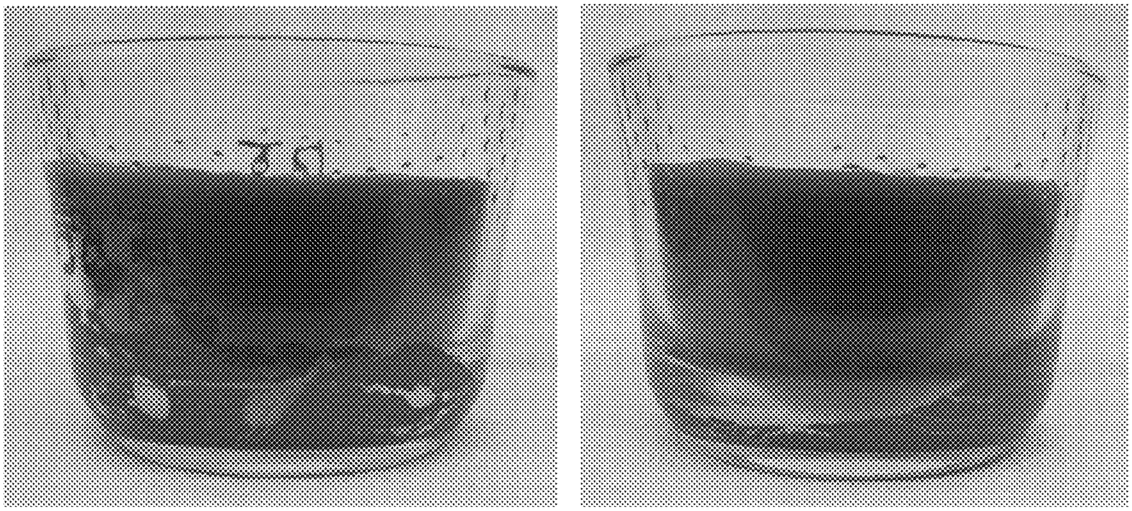
FIG. 6 provides representative images of two candles produced using a process described herein.

First, as a control, two jars were pre-coated with a coating having RP40, which is a cold-end-coating glass coating. A batch of wax was then poured into the jars at a temperature of about 72 degrees Celsius (° C.), and the wax was allowed to cool and solidify at room temperature (about 23° C.). This batch is Sample 1 in Table 1 and FIG. 6 provides representative images of the candles produced using this process.

Figure 7:
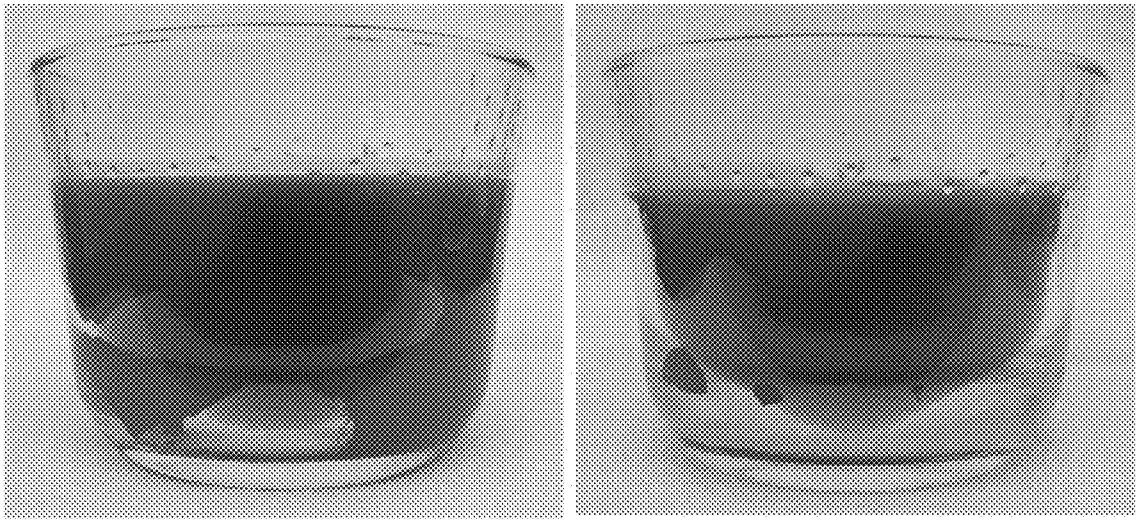
FIG. 7 provides representative images of two candles produced using a process described herein.

Two additional jars were pre-coated with a coating having RP40 and pre-heated to a temperature of about 70° C. for about 24 hours. After pre-heating the glass jars, a batch of wax was poured into the jars at a temperature of about 72° C., and the wax composition was allowed to cool and solidify at room temperature (about 23° C.). This batch is Sample 2 in Table 1 and FIG. 7 provides representative images of the candles produced using this process.

Figure 8:
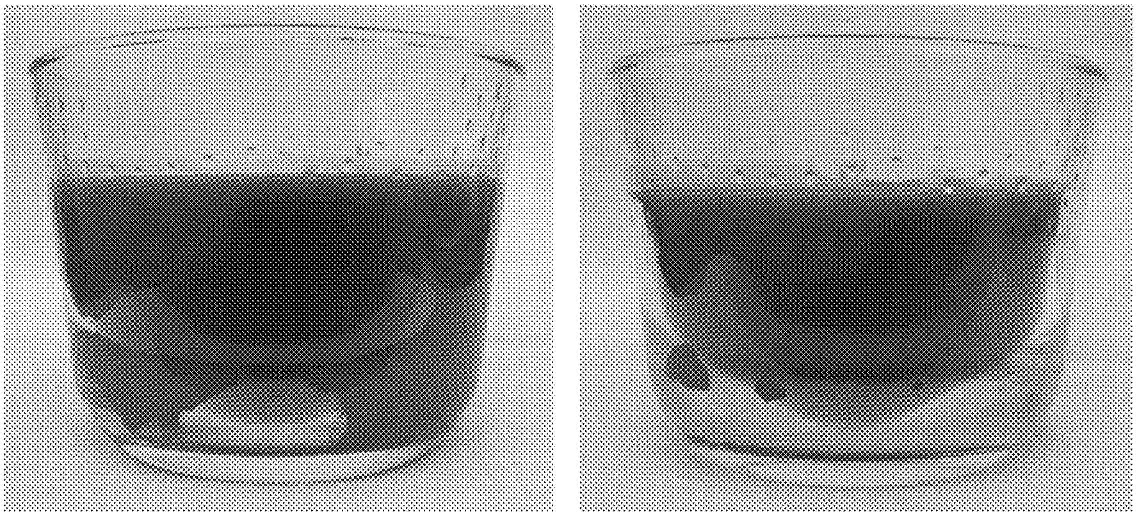
FIG. 8 provides representative images of two candles produced using a process described herein.

Further, two jars were pre-coated with a coating having RP40 and a vegetable oil, i.e., olive oil. For these samples, after pre-coating, a batch of wax was poured into the jars at a temperature of about 72° C., and the wax composition was allowed to cool and solidify at room temperature (about 23° C.). This batch is Sample 3 in Table 1 and FIG. 8 provides representative images of the candles produced using this process.

Figure 9:
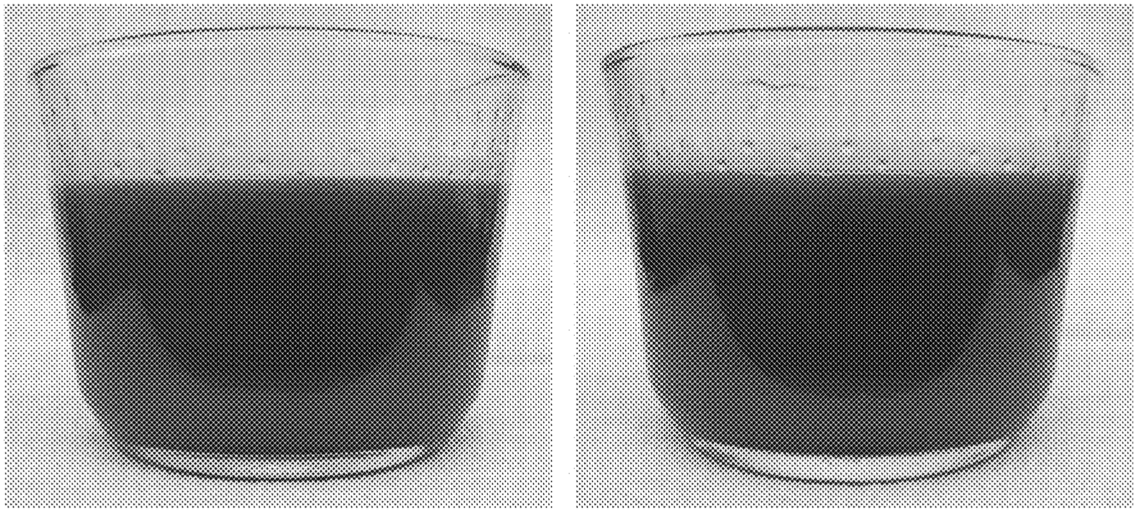
FIG. 9 provides representative images of the two candles produced using a process described herein.

Two additional jars were pre-coated with a coating having RP40 and a vegetable oil (i.e., olive oil) and then pre-heated at a temperature of about 70° C. for about 24 hours. After pre-heating the jars, a batch of wax was poured into the jars at a temperature of about 72° C. The jars, and the wax compositions therein, were allowed to cool and solidify at room temperature (about 23° C.). This batch is Sample 4 in Table 1 and FIG. 9 provides representative images of the candles produced using this process.

Figure 10:
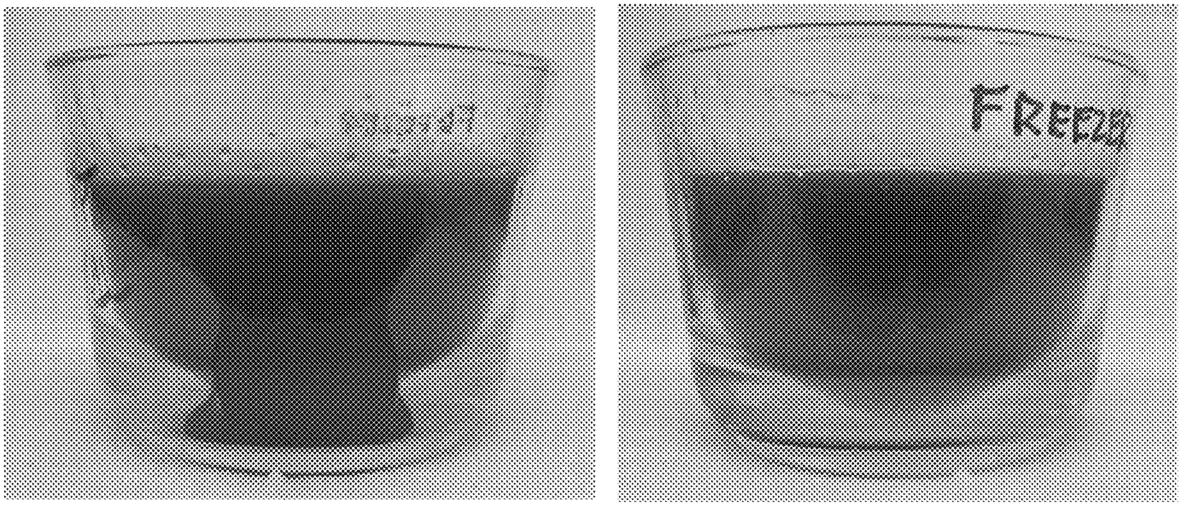
FIG. 10 provides representative images of two candles produced using a process described herein.

Two more jars were pre-coated with a coating having RP40 and a vegetable oil, i.e., olive oil, and then pre-heated at a temperature of about 70° C. for about 24 hours. After pre-heating the jars, a batch of wax was poured into the jars at a temperature of about 72° C. The jars were allowed to cool and solidify at a temperature of about 4° C. for about 25 minutes. This batch is Sample 5 in Table 1 and FIG. 10 provides representative images of the candles produced using this process.

Figure 11:
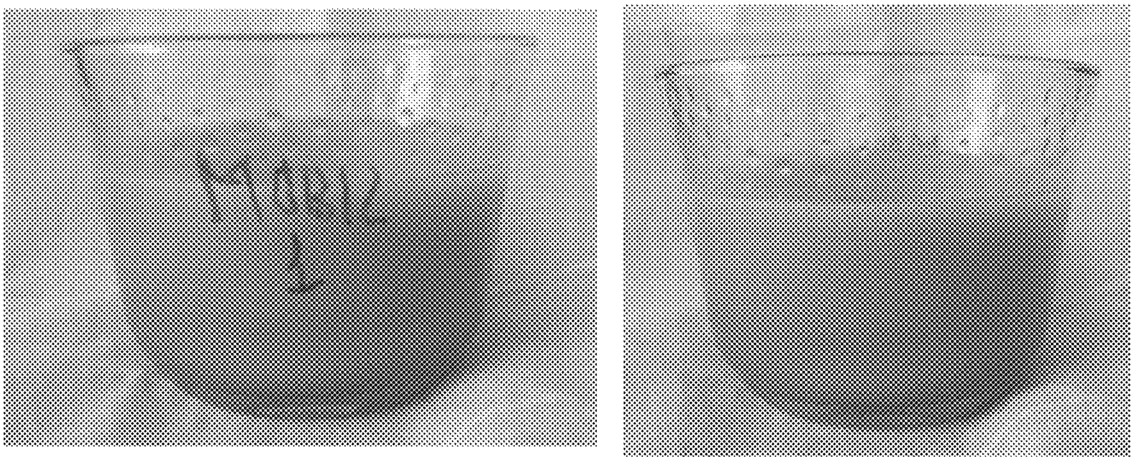
FIG. 11 provides representative images of two candles produced using a process described herein.

Two additional jars were pre-coated with a coating having RP40 and a motor oil, i.e., a motor oil having a viscosity grade of 5W-10, and then pre-heated at a temperature of about 70° C. for about 24 hours. After pre-heating the jars, a batch of wax was poured into the jars at a temperature of about 72° C. The jars were allowed to cool and solidify at a temperature of about 4° C. for at least about 6 hours. This batch is Sample 6 in Table 1 and FIG. 11 provides representative images of the candles produced using this process.

TABLE 1

| | Pre-Coat Composition | Pre-Heat Procedure | Cooling Procedure |
|---|---|---|---|
| Sample 1 | RP40 | N/A | Cooled at Room Temperature |
| Sample 2 | RP40 | Pre-heat at 70° C. for 24 hours | Cooled at Room Temperature |
| Sample 3 | RP40 + Vegetable Oil | N/A | Cooled at Room Temperature |
| Sample 4 | RP40 + Vegetable Oil | Pre-heat at 70° C. for 24 hours | Cooled at Room Temperature |
| Sample 5 | RP40 + Vegetable Oil | Pre-heat at 70° C. for 24 hours | Cooled at 4° C. |
| Sample 6 | RP40 + Motor Oil | Pre-heat at 70° C. for 24 hours | Cooled at 4° C. for over 6 hours |

After candles were produced using the aforementioned processes, the aesthetic appearance and adhesion properties for each candle were observed and measured. Samples 3-6 exhibited improved adhesion compared to Sample 1, and Samples 4-6 exhibited strong adhesion between the wax composition and the interior surface of the glass jar. Exceptionally strong adhesion between the wax composition and the interior surface of the glass jar was observed for Samples 4-6.

Further, Samples 3-6 exhibited little to no haze, or minimal air pockets, between the wax composition and the interior surface of the glass jar. Slight haze, or minor air pockets, was visible in Sample 5. However, the air pockets were still minor in comparison to Sample 1. Air pockets did not form whatsoever in Sample 6, resulting in no visible haze and improved visual appearance compared to Sample 1.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein will enable others skilled in the art to utilize the disclosure. The claims are to be construed to include alternative embodiments to the extent permitted by the prior art.

The term "about," as used herein, refers to variation in the numerical quantity that may occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" may also encompass amounts that differ due to different equilibrium conditions for a composition resulting from a particular initial mixture. In one embodiment, the term "about" refers to a range of values±5% of a specified value.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

The aspects of the candle and process of making thereof described herein advantageously create a candle having improved adhesion properties.

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A candle, comprising:

a jar having a glass interior surface;

a fuel within the jar;

a wick positioned within the fuel; and a material layer comprising an adhesion-enhancing hydrophobic molecule, the material layer at least partially extending between the fuel and the interior surface of the jar, the adhesion-enhancing hydrophobic molecule configured to enhance adhesion to the interior surface, and the molecule consisting of a liquid at room temperature; and wherein the hydrophobic molecule is an oil having a viscosity grade, using the SAE J300 standard, selected from the group consisting of OW-10, 0W-15, OW-20, OW-25, OW-30, 5W-10, 5W-15, 5W-20, 5W-25, and 5W-30.

2. The candle of claim 1, wherein the oil has a viscosity grade of 5W-10.

3. A method for producing a candle, comprising:

a step of providing a jar having a glass interior surface;

a step of pre-coating the interior surface with an adhesion-enhancing hydrophobic molecule that consists of a liquid at room temperature, to improve adhesion of a fuel composition to the interior surface;

a step of pouring the fuel composition into the jar; and a step of allowing the fuel composition to solidify, wherein the hydrophobic molecule is an oil having a viscosity grade, using the SAE J300 standard, selected from the group consisting of OW-10, 0W-15, OW-20, OW-25, OW-30, SW-10, 5W-15, 5W-20, 5W-25, and 5W-30.

4. A method for producing a candle, comprising:

a step of providing a jar having a glass interior surface;

a step of pre-coating the interior surface with an adhesion-enhancing hydrophobic molecule that consists of a liquid at room temperature to improve adhesion of a fuel composition to the interior surface;

a step of pouring a fuel composition into the jar; and a step of allowing the fuel composition to solidify at a temperature below 4° C., wherein the hydrophobic molecule is an oil having a viscosity grade, using the SAE J300 standard, selected from the group consisting of OW-10, 0W-15, OW-20, OW-25, OW-30, 5W-10, 5W-15, 5W-20, 5W-25, and 5W-30.

* * * * *